US005636807A

United States Patent [19]
Warrick

[11] Patent Number: 5,636,807
[45] Date of Patent: Jun. 10, 1997

[54] ACCELERATION SENSOR HAVING INERTIA WEIGHT RESPONSIVE TO ACCELERATIONS IN EVERY DIRECTION

[75] Inventor: James C. Warrick, Tempe, Ariz.

[73] Assignee: H. Koch & Sons Co., Inc., Anaheim, Calif.

[21] Appl. No.: 283,736

[22] Filed: Aug. 1, 1994

[51] Int. Cl.$^6$ ............................................. B60R 22/40
[52] U.S. Cl. ................................... 242/384; 280/806
[58] Field of Search ........................... 242/384.5, 384; 280/806; 297/478

[56] References Cited

U.S. PATENT DOCUMENTS

| | | | |
|---|---|---|---|
| 3,389,607 | 6/1968 | Kishel | 73/492 |
| 4,018,400 | 4/1977 | Henderson | 242/384.5 |
| 4,135,410 | 1/1979 | Filderman | 242/384.5 X |
| 4,193,564 | 3/1980 | Lindblad | 242/384.5 X |
| 4,231,591 | 11/1980 | Close | 280/806 |
| 4,235,391 | 11/1980 | Steger | 20/806 X |
| 4,314,680 | 2/1982 | Takada | 242/384.5 X |
| 4,382,564 | 5/1983 | James | 242/384.5 X |
| 4,413,794 | 11/1983 | Weman | 242/107.4 |
| 4,801,105 | 1/1989 | Frisk | 242/107.4 |

FOREIGN PATENT DOCUMENTS

| 274459 | 6/1963 | Australia | 297/478 |
|---|---|---|---|

Primary Examiner—Daniel P. Stodola
Assistant Examiner—Emmanuel M. Marcelo
Attorney, Agent, or Firm—David A. Greenlee

[57] ABSTRACT

An aircraft inertial webbing reel is mounted in a housing and has a ratchet wheel. A dog is mounted for spring-biased movement into engagement with the ratchet wheel teeth to lock the reel. A spring-biased blocking cam normally blocks movement of the dog. An inertia mass movable within a chamber has opposed end mounting surfaces with conical fittings which define an axis. A linkage comprising a pair of interconnected levers each having a distal end having a conical fitting. The fittings each confine a ball to mount the mass on the lever distal ends. A sliding and pivotal fitting interconnects the lever proximal ends and provides an overcenter mechanism normally biasing the lever distal ends toward each other and against the mounting surfaces to clamp the balls within the conical fittings. A predetermined acceleration of the aircraft in any direction causes the mass to shift the balls and move the lever distal ends away from each other. This moves an output member which shifts the blocking cam to unblock the dog which locks the ratchet wheel, reel and webbing. The housing is mounted with the mass axis oriented laterally of the aircraft so that the linkage provides the same output in response to movement of the mass laterally of the aircraft along the axis or in any direction forwardly and vertically of the aircraft in a plane perpendicular to the axis. In another embodiment, the levers are connected by a link.

27 Claims, 7 Drawing Sheets

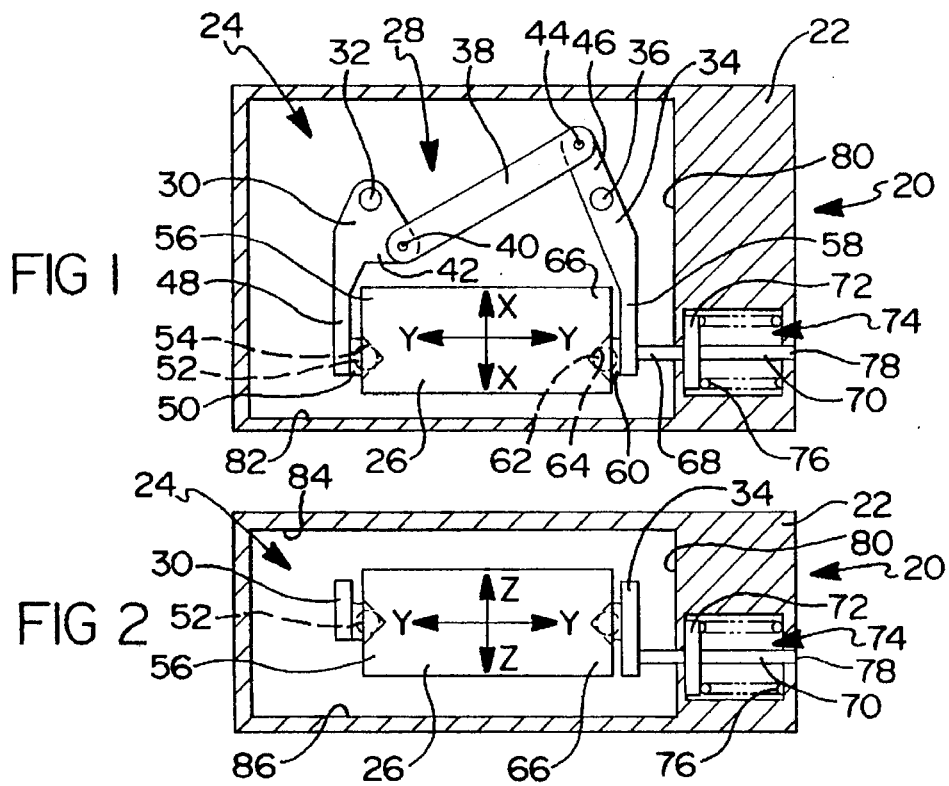
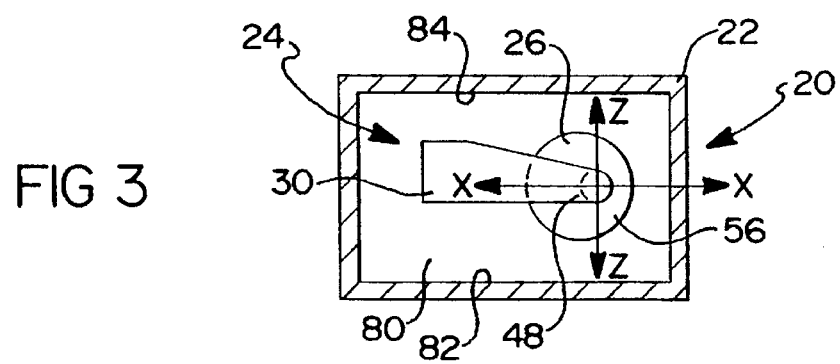
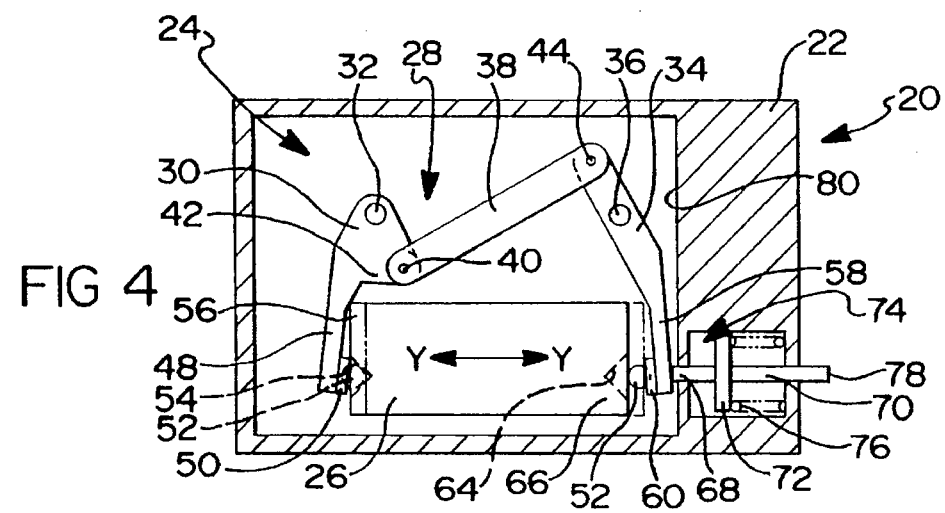

ACCELERATION SENSOR HAVING INERTIA WEIGHT RESPONSIVE TO ACCELERATIONS IN EVERY DIRECTION

BACKGROUND OF THE INVENTION

This invention relates generally to acceleration sensors and, more particularly, to an acceleration sensor which senses acceleration in a multiplicity of directions relative to the sensor.

Acceleration sensors are used for many purposes. Such sensors currently find widespread use in automobiles for locking the seat belts automatically upon detection of a predetermined positive or negative acceleration (deceleration). Such sensors are also used to initiate air bag inflation when a higher predetermined vehicle deceleration occurs.

Many automotive acceleration sensors have an inertia mass which senses acceleration in the generally horizontal directions of travel of the automobile. This mass can take the form of a tilting mass, a swinging pendulum, or a ball rolling up a ramp. In all, a mechanism responds to a predetermined movement of the mass to lock the reel which stores the belt webbing to prevent webbing payout.

Another application for deceleration sensors is to lock aircrew safety harness seat belt reels in response to aircraft acceleration. Since aircraft travel in multiple directions (combinations of vertical and horizontal), the automotive inertia mass movement types of sensors, described above, would be only partially effective, since they are limited in operability to sensing acceleration in generally horizontal directions, or in the plane of vehicle movement.

Most aircraft (and some automotive acceleration) sensors operate by sensing a predetermined acceleration of the storage reel as the harness webbing attempts to unreel from it. This results from aircraft movement which imposes unseating "G" forces on an aircrew member. These sensors sometimes use weights or masses which move sufficiently radially at a predetermined reel speed to actuate a locking mechanism.

Other aircraft sensors use an inertia mass connected to the reel by a screw mechanism. Acceleration of the reel by unwinding webbing accelerates the mass which, due to inertia, lags rotary movement of the reel. This relative motion turns the screw which moves a locking dog axially to engage the reel ratchet teeth and lock the reel. Such an aircraft acceleration sensor is illustrated in U.S. Pat. No. 4,801,105—Frisk.

Such aircraft acceleration sensors do not react directly to vehicle acceleration, but only indirectly by reacting to resultant web and reel acceleration. Since they only indirectly respond to vehicle acceleration, they require some web payout to operate. Also, these types of sensors are use-specific, i.e. useful only with webbing reels or other reactive secondary movements, and cannot be utilized to perform other functions.

It would be desirable to provide an acceleration sensor which responds to acceleration in any direction by providing an output.

It would also be desirable to provide an acceleration sensor which responds to acceleration in any direction by providing a mechanical output to lock a seat belt webbing reel.

It would be further desirable to provide an acceleration sensor which responds to acceleration of the support in any direction to provide an output.

SUMMARY OF THE INVENTION

It is therefore an object of this invention to provide an acceleration sensor which responds to acceleration in any direction by providing an output.

It is another object of this invention to provide an acceleration sensor which responds to acceleration in any direction by providing a mechanical output to lock a seat belt webbing reel.

In one aspect, this invention features an acceleration sensor mounted on a support which responds to acceleration of the support in any direction to provide an output.

Preferably, the acceleration sensor comprises a mass having opposed surfaces, and a linkage secured to the support and engaging said opposed surfaces along an axis to mount the mass for movement in any direction relative to the support in response to acceleration of the support. The linkage is responsive to the relative movement to provide the output. The linkage provides the same predetermined output in response to a predetermined acceleration of the support along said axis or in any direction in a plane perpendicular to said axis.

Preferably, cooperating conical fittings are provided on each mounting surface and on its mating lever distal end to form axially aligned pairs of cooperating fittings. A ball is confined within each pair of cooperating fittings to mount the mass on the lever distal ends;. Spring means bias the lever distal ends toward each other and against the mounting surfaces to clamp the balls within the conical fittings. Movement of the support relative to the mass in any direction other than axial effects relative off-axis movement of at least one pair of cooperating fittings, which causes at least one ball to wedge the adjacent lever distal end away from the mounting surface and away from the other lever distal end to move the output member.

In another aspect, this invention features an inertia reel assembly that comprises a webbing reel which rotates to wind and unwind webbing, locking means actuatable to lock the reel against rotation, and an acceleration sensor mounted on a support which responds to acceleration of the support in any direction to actuate the locking means.

Preferably, the support is a housing for the reel and the acceleration sensor, and the acceleration sensor comprises a mass, a linkage secured to the housing and mounting the mass for movement in any direction relative to the housing in response to acceleration of the housing in the opposite direction, and a movable output member. The linkage is responsive to the relative movement to move the output member to actuate the locking means.

In yet another aspect, this invention features an aircraft inertia reel assembly mounted in an aircraft, comprising a housing and a webbing reel located in the housing which rotates to wind and unwind safety harness webbing stored thereon. A rachet wheel is mounted on the reel for rotation therewith. A dog mounted on the housing for lockingly engaging the ratchet wheel to lock the reel against unwinding movement is biased by spring means into locking engagement with the ratchet wheel. Movable blocking means normally block movement of the dog into said locking engagement. An inertia mass having opposed surfaces is located in a chamber in the housing. A linkage secured to the housing engages said opposed surfaces along an axis to mount the mass for movement in any direction relative to the housing in response to acceleration of the housing in any direction An output member operatively associated with the linkage is responsive to said relative movement of the mass to move the blocking means to unblock movement of the dog by the spring means into said locking engagement with the ratchet wheel.

Preferably, the housing is mounted so that the mass axis extends laterally of the aircraft, and the linkage provides the same predetermined output in response to a predetermined acceleration of the housing in a direction along said axis or in any direction in a plane perpendicular to said axis which comprises axes forwardly and vertically of the aircraft.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a side view of an acceleration sensor according to this invention, with the housing cut away;

FIG. 2 is a top view of the acceleration sensor of FIG. 1;

FIG. 3 is an end view of the acceleration sensor of FIG. 1;

FIG. 4 is a view similar to FIG. 1, illustrating the sensor responding to acceleration along the Y—Y axis;

DETAILED DESCRIPTION OF A PREFERRED EMBODIMENT

Figure 5:
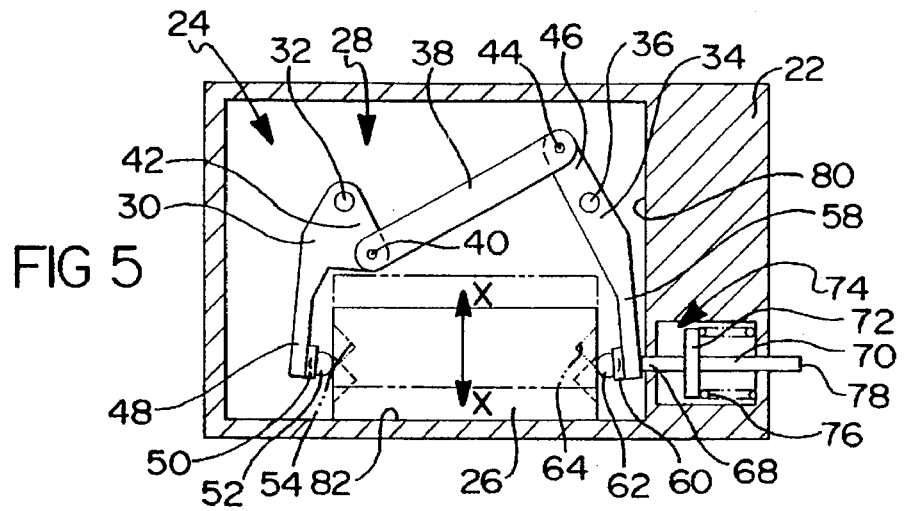
FIG. 5 is a view similar to FIG. 1, illustrating the sensor responding to acceleration along the X—X axis.

One embodiment of this invention is illustrated in FIGS. 1–6, where an acceleration sensor 20 comprises a housing 22 having a chamber 24 that houses an inertia weight 26 that is suspended by a linkage 28 mounted to housing 22. Linkage 28 enables weight 26 to sense inertia in multiple directions, as later described. Linkage 28 includes an end link 30 having a pivot 32 to housing 22 and another end link 34 pivoted to housing 22 at 36. End links 30 and 34 are interconnected by a connecting means or link 38 that is pivoted at 40 to the proximal end 42 of link 30. Similarly, connecting link 38 is pivoted at 44 to the proximal end 46 of link 34.

The distal end 48 of end link 30 mounts a fitting or socket 50 for a connecting ball 52 that is received in a fitting or recess 54 in one end 56 of weight 26. Similarly, the distal end 58 of end link 34 mounts a fitting or socket 60 for another connecting ball 62 that is received in a fitting or recess 64 in the other end 66 of weight 26.

The inner end 68 of an output member 70 extends into chamber 24. Output member 70 mounts an intermediate annular shoulder 72 which is slidable in an annular chamber 74 in housing 22. A preload compression spring 76 biases output member inner end 68 into contact with distal end 58 of end link 34. As shown in FIG. 4, movement of end link 34 by displacement of inertia weight 26 compresses spring 76 and projects output end 78 outwardly of housing 22.

In FIGS. 1 and 2, the long mounting axis of inertia weight 26 between mounting balls 52 and 62 is denominated the Y—Y axis. The plane perpendicular to axis Y—Y is defined by orthogonal axes denominated X—X and Z—Z. Inertia weight 26 is thus suspended within housing 22 by linkage 28, via ball 52 in socket 50 and recess 54 on one end and by ball 62 in socket 60 and recess 64 on the other end for movement relative to housing 22 in any direction, as will now be described.

Any relative movement between housing 22 and inertia weight 26 along axis Y—Y will produce inertial force to move weight 26 from the solid line position to that shown in phantom lines in FIG. 4. Weight end 66 will move end link distal end 58 to pivot end link 34 counterclockwise. Connecting link 38 will pivot end link 30 clockwise about pivot 32 and force the end link distal ends 48 and 58 to spread apart.

End link distal end 58 will push inner end 68 of output member 70 outwardly, against the force of compression spring 76 and project output end 78 outwardly of housing 22 to effect any desired action. Spreading movement of the end link distal ends will be limited by engagement of end link distal end 58 with end wall 80 of housing chamber 24. This same spreading action, resulting in displacement of output member 70, will occur upon movement of inertia weight in either direction, because connecting link 38 will convert such movement against either end link into the spreading of the end link distal ends. When unactuated, end link distal end 58 is spaced close enough to end wall 80 to prevent the spreading of both distal ends from releasing balls 52 and 62 from their confinement within recesses 54 and 64 and sockets 50 and 60.

Movement of inertia weight 26 relative to housing 22 along axis X—X is shown in FIG. 5. Such movement will displace inertia weight 26 to either the extreme solid line position or to the extreme phantom line position, displacing both weight ends 56 and 66 perpendicularly to weight longitudinal axis Y—Y. This offsets both recesses 54 and 64 from their mating distal end sockets 50 and 60 and causes balls 52 and 62 to ramp up the sides of recesses 54 and 64, forcing both end link distal ends 48 and 58 apart. As above, the result is the outward displacement of output member end 78. Downward relative movement of weight 26 is limited by contact with housing bottom wall 82, while upward relative movement is limited by engagement of weight 26 with the bottom of end link proximal end 42. When unactuated, weight 26 is spaced from bottom wall 82 and from the bottom of link proximal end 42 a distance insufficient to enable either or both of balls 52 and 62 to escape from their capture between recesses 54 and 64 and sockets 50 and 60.

Figure 6:
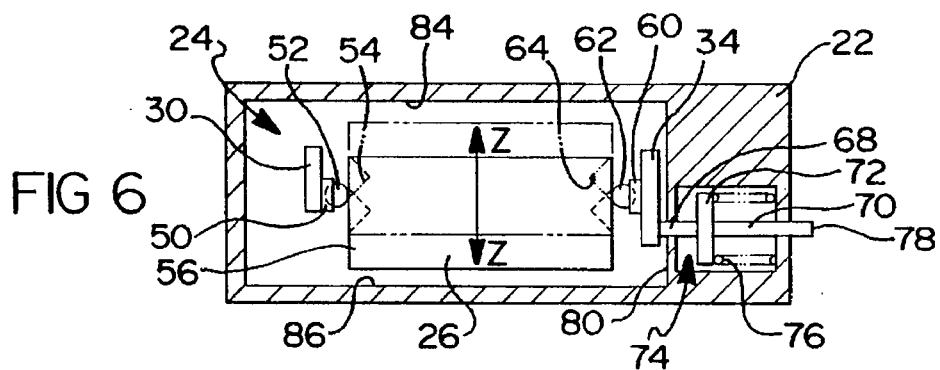
FIG. 6 is a view similar to FIG. 2, illustrating the sensor responding to acceleration along the Z—Z axis.

FIG. 6 shows a similar result from the displacement of weight 26 relative to housing 22 along axis Z—Z. Such movement will displace inertia weight 26 to either the extreme solid line position or to the extreme phantom line position, displacing both weight ends 56 and 66 perpendicularly to weight longitudinal axis Y—Y. This offsets both recesses 54 and 64 from their mating distal end sockets 50 and 60 and causes balls 52 and 62 to ramp up the sides of recesses 54 and 64, forcing both end link distal ends 48 and 58 apart. As above, the result is the outward displacement of output member end 78. Sideward relative movement of weight 26 is limited by contact with housing side walls 84 and 86. When unactuated, weight 26 is spaced from side walls 84 and 86 a distance which assures retention of both balls 52 and 62 between recesses 54 and 64 and sockets 50 and 60 when weight. 26 is displaced in any direction.

Displacement of weight 26 relative to housing 22 in any direction in the X–Z plane would have the same resultant displacement of output member end 78 as described above with regard to displacement along either of the X—X and Z—Z axes. So long as the inertia force exerted on linkage 28 by weight 26 exceeds the force exerted by spring 76, the distal ends will remain spread, with output end 78 projecting from housing 22.

Figure 7:
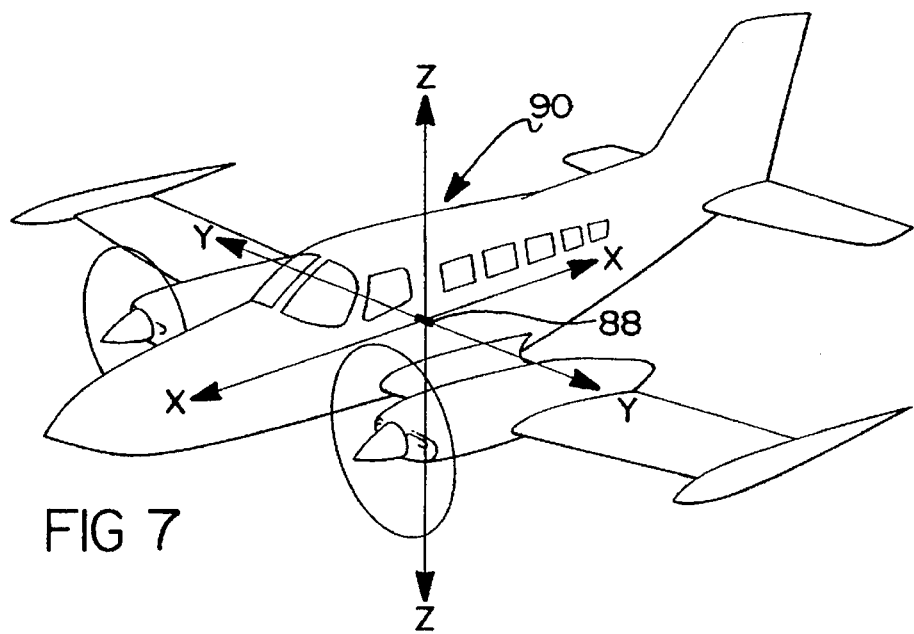
FIG. 7 is a perspective view of an aircraft mounting a preferred embodiment of an acceleration sensor according to this invention.

FIG. 7 illustrates a similar, but preferred embodiment of inertia sensor 88 mounted in an airplane 90 with axis X—X oriented fore-and-aft, axis Y—Y oriented laterally, and axis Z—Z oriented vertically of the airplane. One illustrative use for either of sensors 20 or 88 is to lock an aircraft harness reel, replacing the reel inertia sensor illustrated in the aforementioned U.S. Pat. No. 4,801,105—Frisk.

Sensor 88 is similar in construction to sensor 20. A housing 92 has a chamber 94 that houses an inertia weight 96 that is suspended by a linkage 100 mounted to housing 92. Linkage 100 enables weight 96 to sense inertia in multiple directions, as later described. Linkage 100 includes an L-shaped end link 102 having a pivot 104 to housing 92. Link 102 has a distal end 106 which mounts a fitting 108 having a conical inner surface 110. Adjacent weight end 112 mount a similar fitting 114 having a conical inner surface 116. Both fitting conical surfaces preferably have a 90° included angle and cooperate to confine a ball 118.

Linkage 100 includes another L-shaped end link 120 having a pivot 122 to housing 92. Link 120 has a distal end 124 which mounts a fitting 126 having a conical inner surface 128. Adjacent weight end 130 mount a similar fitting 132 having a conical inner surface 134. Both fitting conical surfaces preferably have a 90° included angle and cooperate to confine a ball 136.

End links 102 and 120 are interconnected by a connecting means in the form of an overcenter device that operates across a line C interconnecting lever pivots 104 and 122. The proximal end 138 of link 102 has a threaded bore 140 which houses a calibration compression spring 142 and has a slotted end 144. The proximal end 146 of link 120 mounts a pin 148 that is received in slotted end 144 of link 102. A set screw 150 is threaded into bore 140 to adjustably compress spring 142 to adjust the preload on pin 148. The force exerted by spring 142 is adjusted by threading set screw 150 through bore 140.

Figure 8:
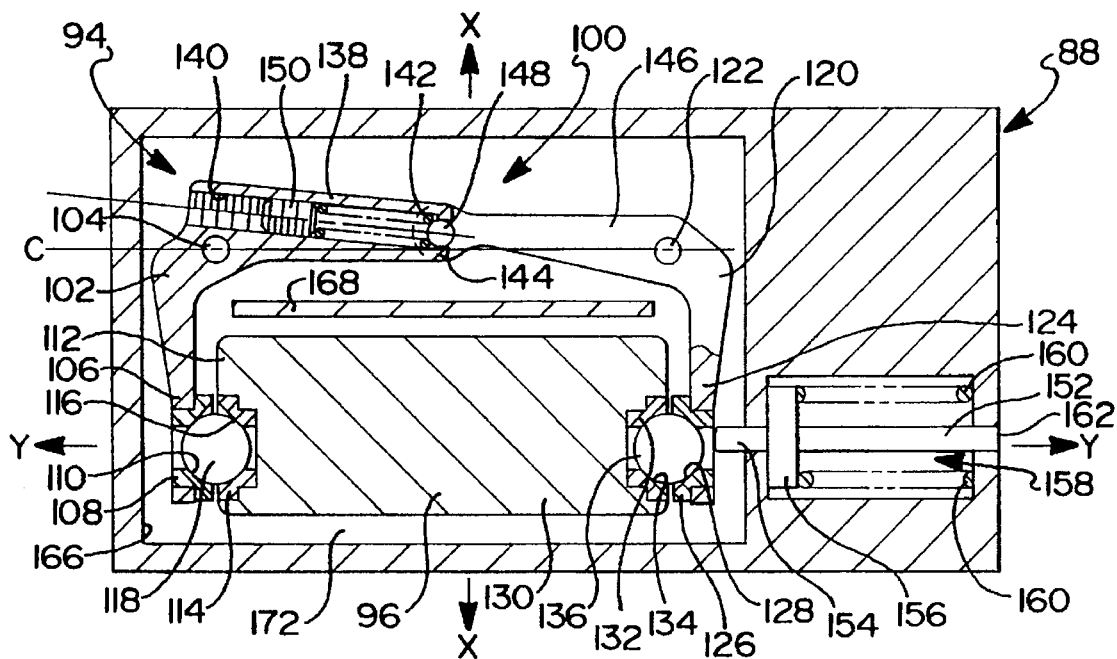
FIG. 8 is a side view of the preferred embodiment of an acceleration sensor according to this invention.

When pin 148 and the force exerted on it by spring 142 are located above line C, as in FIG. 8, spring 142 forces proximal ends 138 and 146 apart, which forces distal ends 106 and 124 together. This forcibly seats balls 118 and 136 in end fittings pairs 108, 114 and 126, 132 along the Y axis and provides a preload on linkage 100 opposing movement of inertia weight 96.

An output member 152 has an inner end 154 extending into chamber 94. Output member 152 mounts an intermediate shoulder 156 which is slidable in a chamber 158 in housing 92. A main preload compression spring 160 biases output member inner end 154 into contact with distal end 124 of link 120. Spring 160 imposes the main preload on linkage 100 which opposes movement of inertia weight 96, while spring 142 is adjustable to calibrate this preload.

Figure 9:
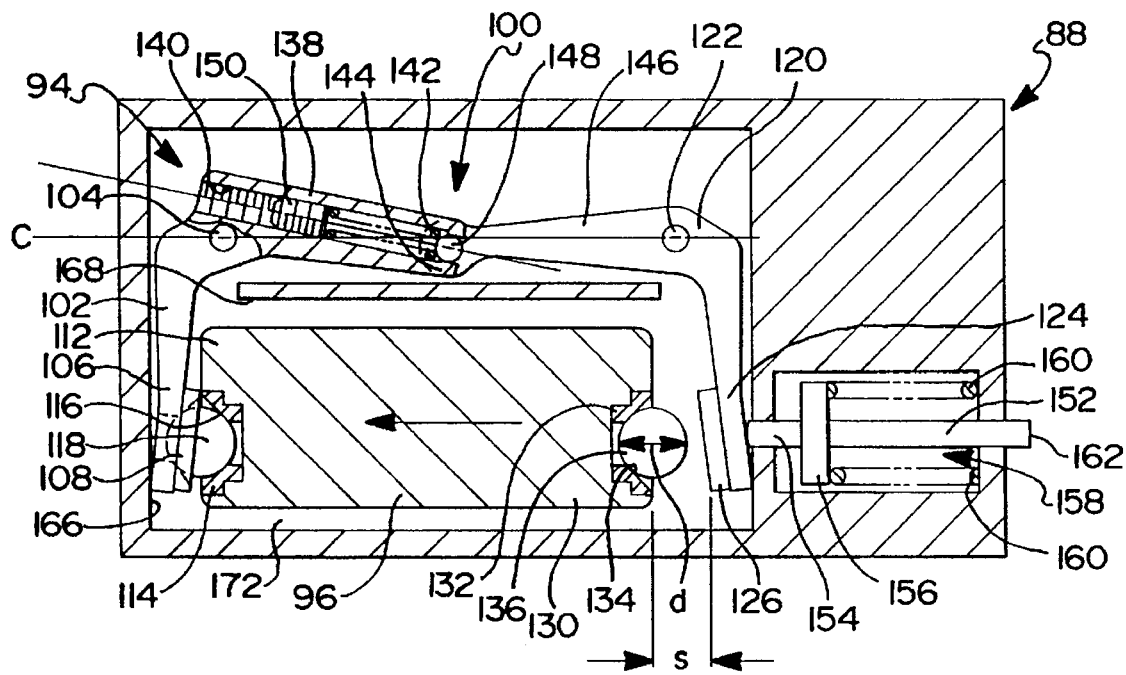
FIG. 9 is a view similar to FIG. 8, illustrating the sensor responding to acceleration in one direction along the Y—Y axis.
Figure 10:
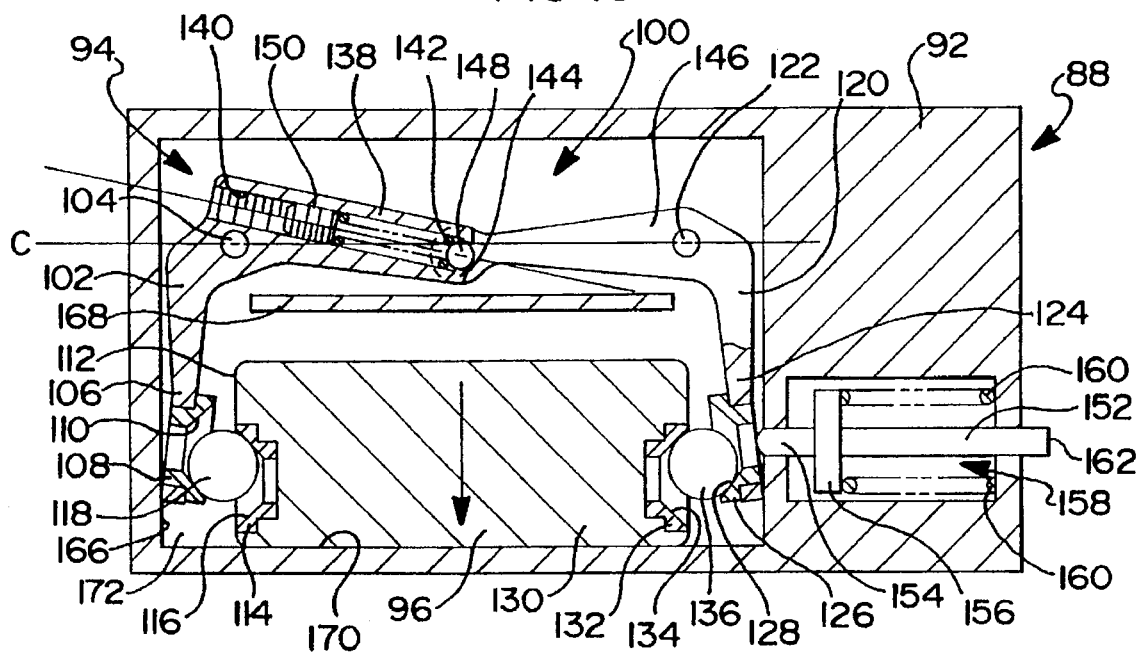
FIG. 10 is a view similar to FIG. 8, illustrating the sensor responding to acceleration along the X—X axis.
Figure 11:
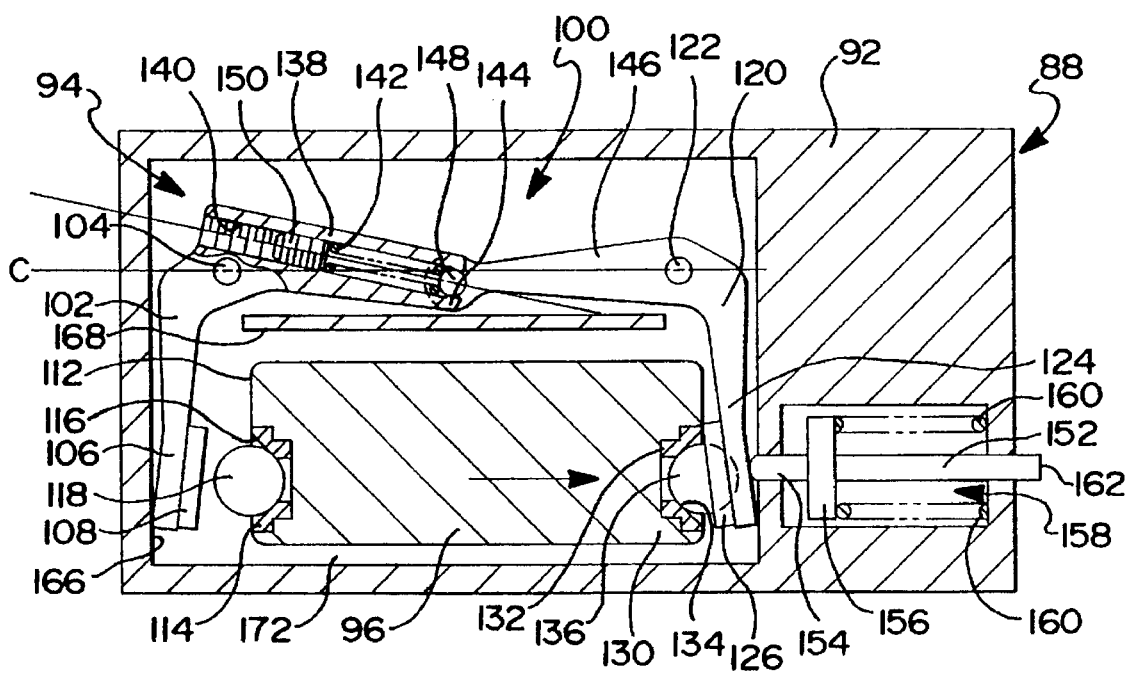
FIG. 11 is a view similar to FIG. 8, illustrating the sensor responding to acceleration in the other direction along the Y—Y axis.

Operation is similar to that described above in reference to sensor 20. Movement of end link 120 by inertial displacement of weight 96 will compress spring 160 and project output end 162 outwardly of housing 92. FIGS. 9–11 illustrate that movement of inertia weight 96 in directions of the Y—Y and X—X axes (and, by analogy, of the Z—Z axis) results in a force exerted against one or both link distal ends 106 and 124. When this force exceeds the threshold force resulting from the combined force exerted by springs 142 and 160, connecting pin 148 will move across line C from the FIG. 8 position to the position shown in FIGS. 9–11, i.e overcenter. This will cause link distal end 124 to move output member 152 and project output end 162 outwardly of housing 92.

This overcenter condition of linkage 100, with output member end 162 held projected outward, will be maintained so long as the torque on link 120 resulting from the force of spring 160, plus the inertia force of weight 96, exceeds the counteracting torque resulting from the force of spring 142.

Movement of weight 96 in both directions along the axis is illustrated in FIGS. 9 and 11 and is similar to that described above in reference to FIG. 4. Weight movement will ramp balls 118 and 136 up fitting inner surfaces 110, 116 and 128, 134 to wedge the distal ends 106 and 124 apart.

Movement of link distal ends 106 and 124 apart is limited by engagement of these ends with end walls 166 and 164 of chamber 94. As shown in FIG. 9, the maximum spacing s between link fitting 126 and weight fitting 132 is less than the diameter d of ball 136. This assures retention of both balls 118 and 136 within their confining fitting pairs 108, 114 and 126, 132 regardless of the force exerted on linkage 100 by weight 96.

Movement of weight 96 in a direction along the X—X axis is shown in FIG. 10 and is similar to that described above in reference to FIG. 5. Movement of weight 96 is limited by engagement of weight 96 with an intermediate chamber wall 168 and chamber lower wall 170. Movement of weight 96 in a direction along the Z—Z axis is not illustrated but is similar to that described above in reference to FIG. 6. Weight movement is physically limited by engagement of weight 96 with the chamber side walls, only one of which 172 is shown.

The inertia force for overcoming the spring preload and actuating the output member will be the same for weight movement in the X-Z plane or along the Y—Y axis, so long as the fitting cone ramp angles are 45° (90° included angle). Inertia sensor 88 also operates upon inertia movement of weight 96 relative to housing 92 in any other direction (i.e. other than along the Y—Y axis or in the X-Z plane) to actuate the output member, as illustrated in FIGS. 12 and 13.

Figure 12:
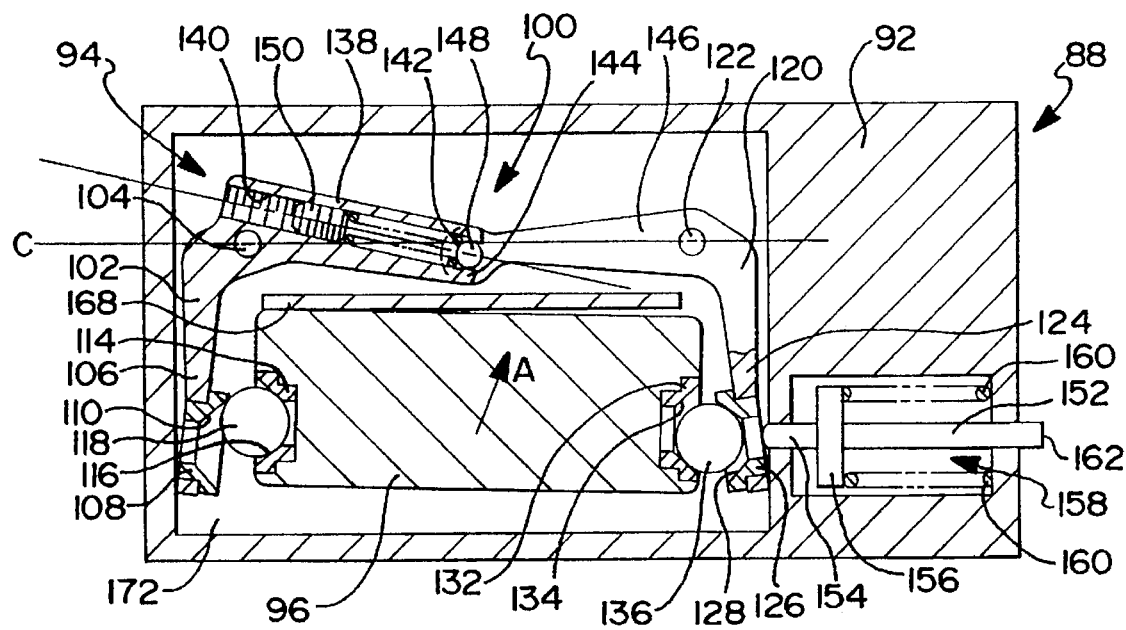
FIG. 12 is a view similar to FIG. 8, illustrating the sensor responding to acceleration in a direction slightly off the X—X axis and toward the Y—Y axis.

Movement of weight 96 relative to housing 92 in a direction slightly off the X-Z plane is shown in FIG. 12. Relative movement of weight 96 in the indicated A direction will cause weight 96 to tilt and shift upwardly. Weight 96 will pivot about ball 136, with fittings 126, 132 slightly separating. Ball 118 will ramp up the inner surface of fitting 108 until weight 96 engages intermediate wall 168. This will wedge the distal ends 106 and 124 apart to move linkage 100 overcenter as above.

Figure 13:
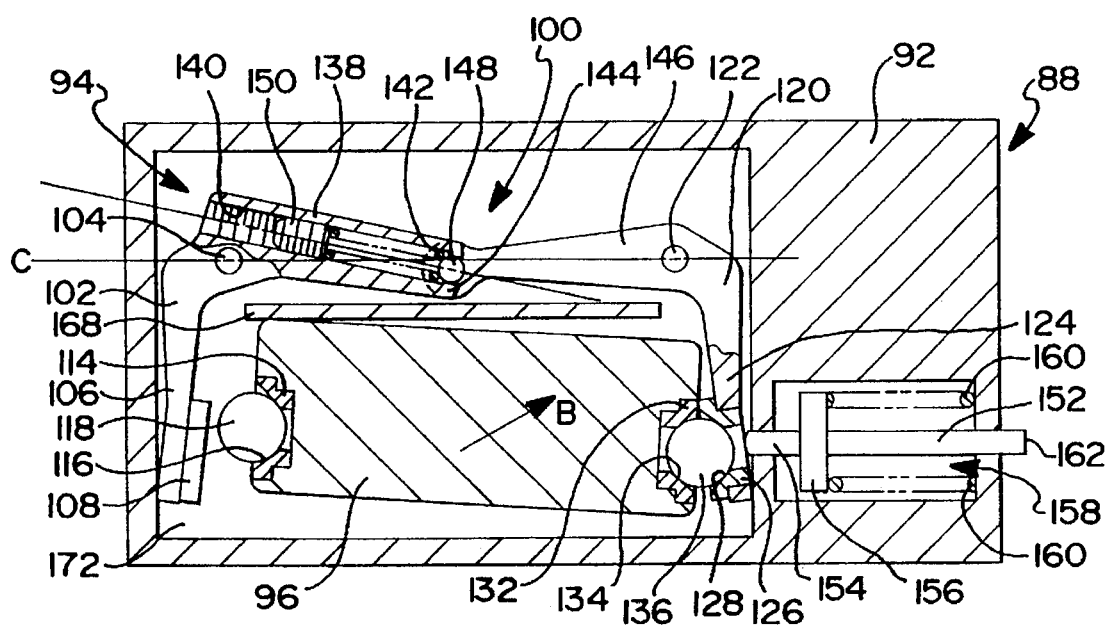
FIG. 13 is a view similar to FIG. 8, illustrating the sensor responding to acceleration in a direction slightly off the Y—Y axis and toward the X—X axis.

Movement of weight 96 relative to housing 92 in a direction at an approximate 45° angle to the X–Z plane and Y—Y axis is shown in FIG. 13. Relative movement of weight 96 in the indicated B direction will cause weight 96 to tilt more severely, pivoting about ball 136, which is clamped tightly between fittings 126, 132, until intermediate wall 168 is impacted. Fittings 108, 114 will separate. Again, distal ends 106 and 124 are forced apart to move linkage 100 overcenter as above.

Figure 16:
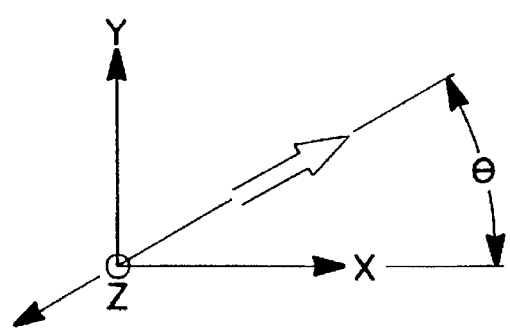
FIG. 16 is an acceleration diagram.

FIG. 16 illustrates inertia forces resulting in relative movement of weight 96 along a Vector V at an angle θ to the X–Z plane. The acceleration required to trigger sensor 88 by effecting weight movement is calculated by:

$$a_\Theta = \frac{a_{max}}{|\sin\Theta| + |\cos\Theta|}$$

where $a_\Theta$ and $a_{max}$ are acceleration at angle θ and acceleration in the mutually perpendicular axes, respectively, and $|\sin\Theta|$ and $|\cos\Theta|$ are the absolute values of $\sin\Theta$ and $\cos\Theta$ respectively, i.e., positive values.

Operation of inertia sensor 20 upon relative movement of its weight 26 in directions between the Y—Y axis and the X–Z plane would be the same as just described. Thus, it is seen that an inertia sensor according to the disclosed embodiments of this invention respond to acceleration in any direction to provide an output.

Figure 14:
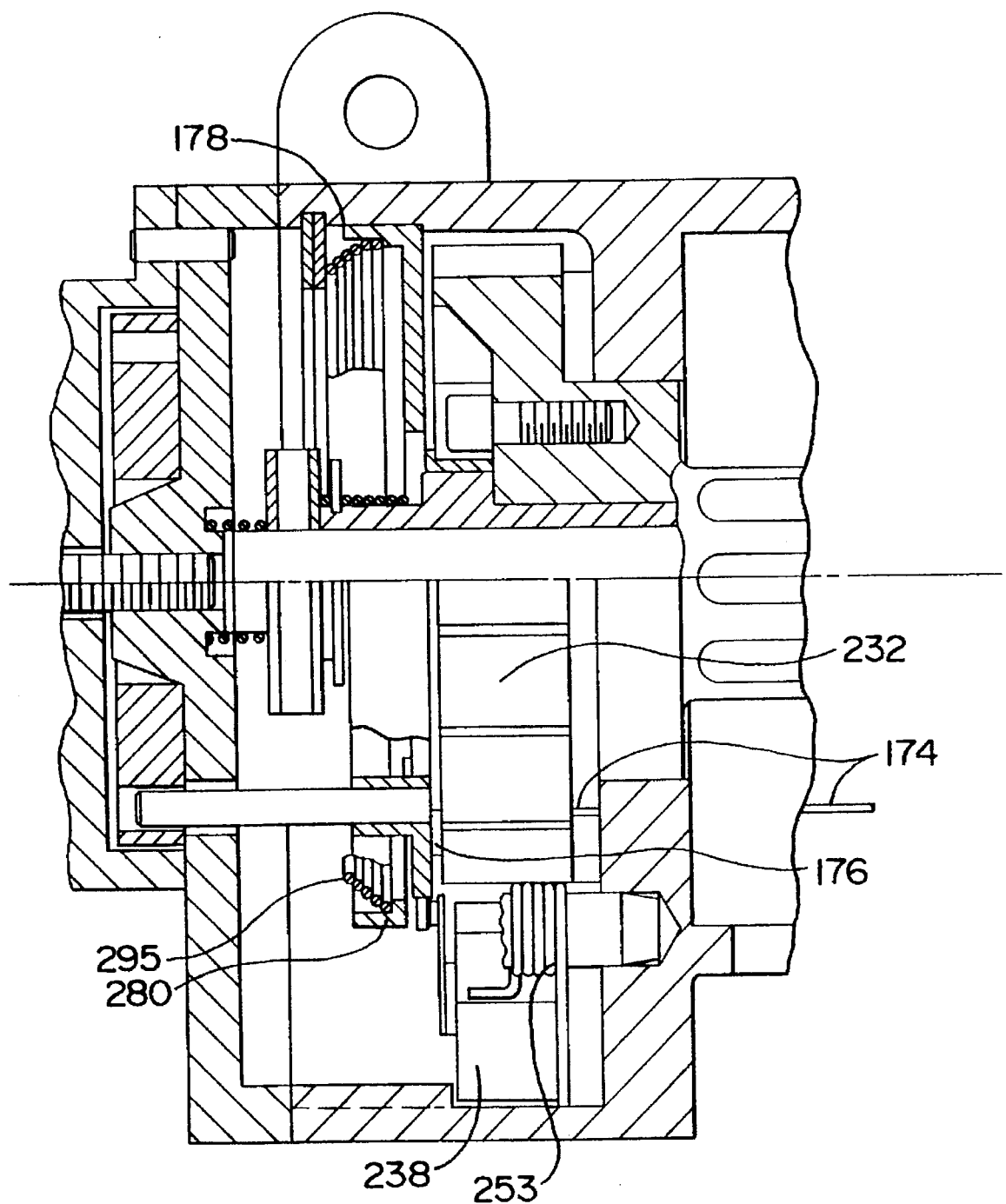
FIG. 14 is a sectioned partial view of an aircraft webbing retractor having a reel lock actuatable by the acceleration sensor of FIGS. 8–13, with the lock illustrated prior to actuation by the acceleration sensor.

A specific application for this acceleration sensor is as a replacement for the aircraft reel rotation inertia sensor, the operation of which is described in, especially FIGS. 2, 3, 9a, 9b, 9c and 9d, of the aforementioned U.S. Pat. No. 4,801,105—Frisk. To simplify understanding of this application, the structure shown in FIGS. 2 and 3 of that patent, modified to remove the reel inertia mass operation structure and to include an operative extension of output member 152 of acceleration sensor 88, is reproduced in FIGS. 14 and 15 herein. Component parts shown in the patent which are common to FIGS. 14 and 15 carry the same numerical designation, but increased by 200. Thus, patent cam 80 is identified as cam 280 in FIGS. 14 and 15 herein.

Figure 15:
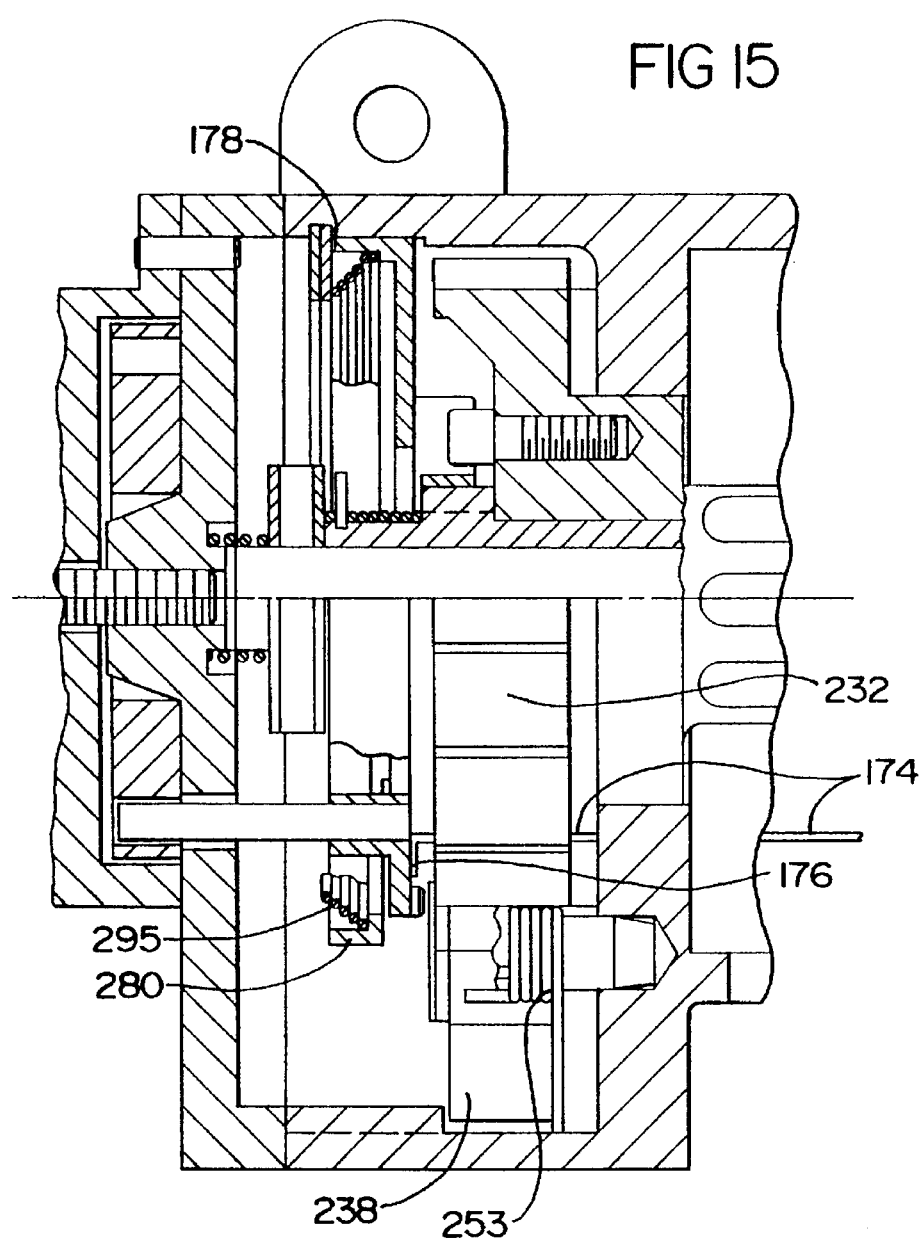
FIG. 15 is a view similar to FIG. 14, illustrating the webbing lock after actuation by the acceleration sensor.

Cammed sear 280, shifted axially in the patent, is here tilted by axial movement of an operating rod 174 which engages output member end 162. When output member 152 is shifted in response to inertia movement of weight 96, end 162 will shift operating rod 174 which mounts an operating head 176. Operating head 176 will tilt cammed sear 280 about upper edge 178 against the force of spring . This enables dog 238 to engage the teeth of reel ratchet wheel 232 under the influence of dog spring 253, as shown in FIG. 15. Otherwise, operation of the ratchet lock is as described in the patent.

Operation and response of these acceleration sensors can be tailored to varying requirements by varying the mass of the weight, link length, linkage geometry, spring rates, fitting ramp angles, and ball diameter.

While only a preferred and alternate embodiments have been illustrated and described, obvious modifications thereof are contemplated within the scope of this invention and the following claims.

I claim:

1. An acceleration sensor including a support, an output, an inertial mass having opposed surfaces, and a movable linkage secured to the support and engaging said opposed surfaces along an axis to suspend the mass from the support for movement relative to the support in response to acceleration of the support in every direction, the linkage being responsive to said relative movement to operate the output.

2. The acceleration sensor of claim 1, wherein the linkage provides the same predetermined output in response to a predetermined acceleration of the support in a direction along said axis or in any direction in a plane perpendicular to said axis.

3. The acceleration sensor of claim 1, including biasing means biasing the mass against said relative movement.

4. The acceleration senator of claim 1, wherein the linkage provides the same predetermined output in response to a predetermined acceleration of the support in any direction in a plane or in a direction perpendicular to that plane.

5. The acceleration sensor of claim 1, wherein the mass has spaced mounting surfaces, the linkage comprises a pair of levers mounted on the support, each having a distal end engaging one of the mounting surfaces along an axis to mount the mass and having interconnected proximal ends, said distal ends moving away from each other in response to said relative movement, and the output includes an output member movable in response to said movement of the distal ends.

6. The acceleration sensor of claim 5, including a link pivotally interconnecting the proximal ends of the levers, wherein the levers are pivotally mounted on the support, and movement of the link and levers are coplanar.

7. The acceleration sensor of claim 5, wherein the levers have pivots to the support intermediate their proximal and distal ends, and including connecting means pivotally and slidably interconnecting the proximal ends of the levers.

8. The acceleration sensor of claim 5, including biasing means biasing the mass against said relative movement.

9. The acceleration sensor of claim 8, including cooperating conical fittings on each mounting surface and on its mating lever distal end to form axially aligned pairs of cooperating fittings, a ball confined within each pair of cooperating fittings to mount the mass on the lever distal ends, and the biasing means comprise a spring biasing the lever distal ends toward each other and against the mounting surfaces to clamp the balls within the conical fittings, whereby movement of the support relative to the mass in any direction other than axial effects relative off-axis movement of at least one pair of cooperating fittings, which causes at least one ball to wedge the adjacent lever distal end away from the mounting surface and away from the other lever distal end to move the output member.

10. The acceleration sensor of claim 9, wherein the linkage provides the same predetermined output in response to a predetermined acceleration of the support along said axis or in any direction in a plane perpendicular to said axis.

11. The acceleration sensor of claim 9, wherein the support includes a housing for the mass which restricts said relative movement.

12. The acceleration sensor of claim 11, wherein the housing includes walls which limit movement of the mass to maintain confinement of the balls within the cooperating fittings upon movement of the mass in any direction.

13. The acceleration sensor of claim 12, wherein the levers have pivots to the support intermediate their proximal and distal ends, and including connecting means pivotally and slidably interconnecting the proximal ends of the levers.

14. The acceleration sensor of claim 13, wherein the connecting means include second biasing means to provide an overcenter device which biases the lever proximal ends apart and the lever distal ends together when the lever proximal ends are located on one side of a line interconnecting the lever pivots, and which responds to said relative movement to shift the lever proximal ends overcenter across said line bias them apart to bias the lever distal ends apart to move the output member.

15. The acceleration sensor of claim 14, wherein the spring engages one link to bias the link distal ends together in all linkage positions.

16. The acceleration sensor of claim 15, wherein the spring operatively engages the distal end of said one link.

17. The acceleration sensor of claim 15, wherein the second biasing means include a second spring and means for varying the force of the second spring to vary the threshold inertial mass force required to shift the lever proximal ends overcenter.

18. An inertia reel assembly comprising a webbing reel secured to a support within a housing for movement therewith which rotates to wind and unwind webbing stored thereon, locking means actuatable to lock the reel against rotation, and an acceleration sensor including an output, an inertial mass, a movable linkage secured to the housing which suspends the mass within the housing for movement in every direction relative to the housing in response to acceleration of the housing in the opposite direction to operate the output to actuate the locking means, and biasing means extending between the support and the mass which opposes said relative movement to provide a force threshold which inhibits movement of the mass.

19. The inertia reel assembly of claim 18, wherein the mass has spaced mounting surfaces, the linkage comprises a pair of interconnected levers mounted on the housing, each having a distal end engaging one of the mounting surfaces along an axis to mount the mass, said distal ends moving away from each other in response to said relative movement to move the output member.

20. The inertia reel assembly of claim 19, including cooperating conical fittings on each mounting surface and on its mating lever distal end to form axially aligned pairs of cooperating fittings, a ball confined within each pair of cooperating fittings to mount the mass on the lever distal ends, and spring means biasing the lever distal ends toward each other and against the mounting surfaces to clamp the balls within the conical fittings, whereby movement of the housing relative to the mass in any direction other than axial effects relative off-axis movement of at least one pair of cooperating fittings, which causes at least one ball to wedge the adjacent lever distal end away from the mounting surface and away from the other lever distal end to move the output member.

21. The inertia reel assembly of claim 20, wherein the housing includes a chamber for the mass having walls which limit movement of the mass to maintain confinement of the balls within the cooperating fittings upon movement of the mass in any direction.

22. The inertia reel assembly of claim 21, wherein the levers have pivots to the housing intermediate their proximal and distal ends, and including connecting means pivotally and slidably interconnecting the proximal ends of the levers.

23. The inertia reel assembly of claim 22, wherein the connecting means include biasing means providing an overcenter device which biases the lever proximal ends apart and the lever distal ends together when located on one side of a line interconnecting the lever pivots, and is movable by said relative movement across said line to bias the lever proximal ends apart to bias the lever distal ends apart.

24. The inertia reel assembly of claim 23, wherein the conical fittings have a 90° included angle centered on said axis, thereby enabling the linkage to provide the same predetermined output in response to a predetermined acceleration of the housing in a direction along said axis or in any direction in a plane perpendicular to said axis.

25. The inertia reel assembly of claim 24, including a preload spring which engages one link to bias the link distal ends together in all linkage positions.

26. An aircraft inertia reel assembly mounted in an aircraft, comprising a housing, a webbing reel located in the housing which rotates to wind and unwind safety harness webbing stored thereon, a rachet wheel mounted on the reel for rotation therewith, a dog mounted on the housing for lockingly engaging the ratchet wheel to lock the reel against unwinding movement, spring means biasing the dog into locking engagement with the ratchet wheel, movable blocking means normally blocking movement of the dog into said locking engagement, an inertia mass having opposed surfaces located in a chamber in the housing, a movable linkage secured to the housing and engaging said opposed surfaces along an axis to suspend the mass within the housing for movement relative to the housing in response to acceleration of the housing in every direction, and an output member operatively associated with the linkage, the output member being responsive to said relative movement of the mass to move the blocking means to unblock movement of the dog by the spring means into said locking engagement with the ratchet wheel.

27. The aircraft inertia reel assembly of claim 26, wherein the housing is mounted so that said axis extends laterally of the aircraft, and the linkage provides the same predetermined output in response to a predetermined acceleration of the housing in a direction laterally of the aircraft along said axis or in any direction in a plane perpendicular to said axis which comprises axes forwardly and vertically of the aircraft.

* * * * *